United States Patent
Husain et al.

(10) Patent No.: US 10,289,082 B2
(45) Date of Patent: May 14, 2019

(54) APP STORE FOR STATE MACHINES

(71) Applicant: LINESTREAM TECHNOLOGIES, Cleveland, OH (US)

(72) Inventors: Ali Husain, Shaker Heights, OH (US); Greg Jackson, Westlake, OH (US); Chris Knaack, Bay Village, OH (US); David Stopher, Cleveland, OH (US)

(73) Assignee: DANFOSS POWER ELECTRONICS A/S, Grasten (DK)

( * ) Notice: Subject to any disclaimer, the term of this patent is extended or adjusted under 35 U.S.C. 154(b) by 829 days.

(21) Appl. No.: 14/868,735

(22) Filed: Sep. 29, 2015

(65) Prior Publication Data
US 2016/0094628 A1    Mar. 31, 2016

Related U.S. Application Data

(60) Provisional application No. 62/057,128, filed on Sep. 29, 2014.

(51) Int. Cl.
*G05B 15/02* (2006.01)
*G05B 19/00* (2006.01)
*H04W 4/60* (2018.01)
*G05B 19/042* (2006.01)

(52) U.S. Cl.
CPC .......... *G05B 15/02* (2013.01); *G05B 19/0426* (2013.01); *H04W 4/60* (2018.02); *G05B 2219/23415* (2013.01)

(58) Field of Classification Search
CPC ............... G05B 15/02; G05B 19/0426; G05B 2219/23415; H04W 4/60
See application file for complete search history.

(56) References Cited

U.S. PATENT DOCUMENTS

| | | | |
|---|---|---|---|
| 5,278,390 A | * | 1/1994 | Blankenship ........ B23K 9/0953 219/125.1 |
| 5,804,373 A | | 9/1998 | Schweitzer et al. |
| 6,052,600 A | | 4/2000 | Fette et al. |
| 6,195,091 B1 | | 2/2001 | Harple et al. |

(Continued)

FOREIGN PATENT DOCUMENTS

WO    2013/151504    10/2013

OTHER PUBLICATIONS

International Search Report & Written Opinion for PCT Application Serial No. PCT/US15/52826, dated Dec. 30, 2015, 11 pages.

*Primary Examiner* — Ronald D Hartman, Jr.
(74) *Attorney, Agent, or Firm* — Amin, Turocy & Watson LLP

(57) ABSTRACT

An app store includes a plurality of state machines that describe the function of a product. The system allows a user to select at least one app from this plurality of apps. The user may also customize the state machine represented by the app or parameters thereof. The selected state machine can be translated into a format readable by a semiconductor device in a target platform without requiring the user to generate computer code. The app store can also transact rights to use the app represented by the state machine. The state machine may be executed in a simulation environment, on a reference platform or development board, or on a semiconductor device in an end-user product to facilitate control in accordance with the state machine defined by the state machine.

26 Claims, 9 Drawing Sheets

(56) References Cited

U.S. PATENT DOCUMENTS

| | | | |
|---|---|---|---|
| 6,415,384 | B1 | 7/2002 | Dave |
| 6,721,581 | B1 | 4/2004 | Subramanian |
| 9,905,038 | B2 * | 2/2018 | Robbins ................ G06T 15/005 |
| 2006/0036770 | A1 | 2/2006 | Hosn et al. |
| 2008/0126882 | A1 | 5/2008 | Fulton et al. |
| 2009/0005886 | A1 | 1/2009 | Gao et al. |
| 2012/0280848 | A1 * | 11/2012 | Card ....................... G01S 7/021 |
| | | | 342/13 |
| 2014/0121861 | A1 * | 5/2014 | Mood ................. G06F 9/44505 |
| | | | 701/3 |

* cited by examiner

APP STORE FOR STATE MACHINES

CROSS-REFERENCE TO RELATED APPLICATIONS

This application claims the benefit of U.S. Provisional Patent Application Ser. No. 62/057,128, filed on Sep. 29, 2014, and entitled "AN APP STORE FOR STATE MACHINES," the entirety of which is incorporated herein by reference.

TECHNICAL FIELD

This disclosure generally relates to application stores, or app stores, and in particular, to methods and apparatuses for an app store for state machines for products, such as semiconductor devices, for use by persons responsible for product development.

BACKGROUND

Many electro-mechanical systems, devices, and products include control systems programmed to control their operation according to a predefined control algorithm. For example, systems that include a motor for controlling a position and/or speed of an electro-mechanical component typically include a control system executing a control algorithm that controls operation of the motor according to a defined system operation routine or sequence. These control systems may be implemented in part on semiconductor devices such as microcontrollers or other programmable integrated circuit.

Although there are a number of commonalities among control applications of a similar type, control routines differ across different control applications depending on the particular application in which the routine is used. For example, a process for control of a particular type of three-phase induction motor may be a key building block for many types of products that use such motors. However, the program for controlling the motor as an agitator in a washing machine differs from a program for controlling the same motor as a roller in a conveyor system. Despite the commonalities between control routines for various types of products, designers must often develop the control routines for a given product by writing a considerable amount of control code, which may include both common control functionality for a given type of control application as well as custom code particular to the product for which the control code is being written.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to an app store for state machine applications that can be downloaded and executed to facilitate control of one or more electro-mechanical components of a product, system, or device. In one or more embodiments, the app store described herein stores, categorizes, and distributes apps representing state machines that describe an operation or control sequence of a target product. The apps can be categorized based on a type of product or control application to which the associated state machines relate, a vendor of a target platform for the state machines, or other classification criteria. The app store allows a user to select and retrieve at least one app from the plurality of stored apps, and optionally modify one or more parameters of the state machine defined by the app in order to customize the state machine operation to the needs of a particular target application on which the state machine application will be executed. A retrieved—and optionally modified—state machine application can be installed on a controller (e.g., a microcontroller or other type of semiconductor controller) and executed to facilitate control of a product, product component, system, or device in accordance with the state machine.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
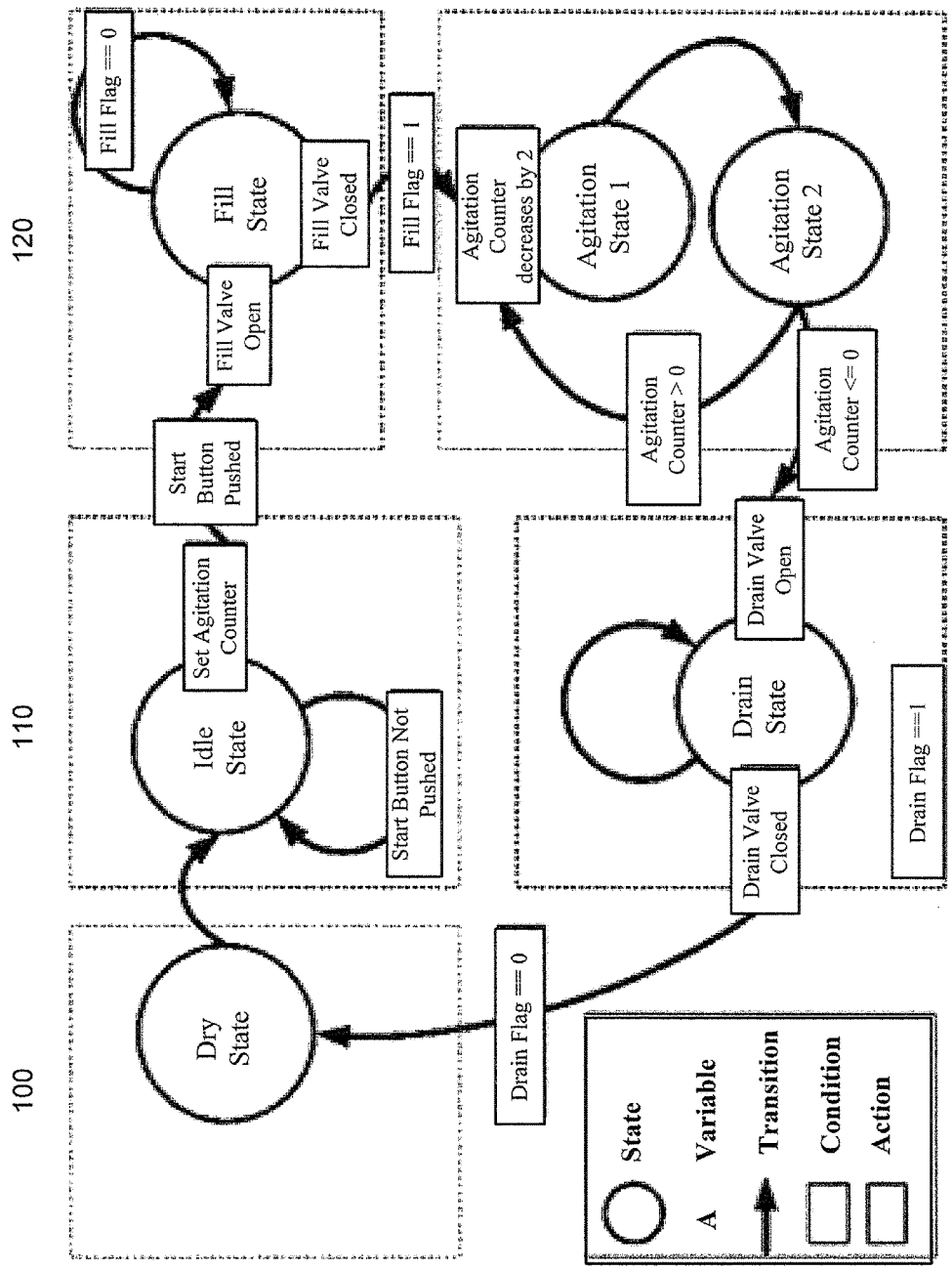
FIG. 1 is a depiction of a state machine for a washing machine app.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

File transfer protocol (FTP) is a network protocol used to transfer or share files between computers of transmission control protocol (TCP) networks such as the Internet. Files transferred or shared in this manner can comprise computer software, such as source code, digital media or applications. Some hosted media stores implement transactions in connection with downloading of content, such that users are charged for downloading certain types of content to an end user's device (e.g., mobile phone, table computer, laptop computer, desktop computer, etc.).

Hosted media stores that facilitate download of applications—referred to as "app stores"—address certain classes of end-user computing devices, and also perform transactions in connection with downloading of apps. Apps can be generally classified according to the type of transaction associated with the download of the app. For example, free apps can be downloaded without charge, paid apps must be purchased by the end user prior to download, and hybrid apps known as "freemium" apps are free to download but include optional upgrade features that are available for purchase.

Some app stores implement transactional features of end-user device app stores, but with a focus on lower-level software code. For example, some app stores allow software developers and information technology (IT) professionals to find, transact, and deploy software.

In the field of electronic design automation (EDA), and in the semiconductor field in particular, an intellectual property (IP) core or IP block is a unit of logic or data that can be reused in multiple semiconductor designs, typically belonging to one party. Example IP cores or IP blocks include, but are not limited to, processors, memory, input-output connectivity, analog functional blocks, etc. IP cores or IP blocks are categorized as either soft cores or hard cores. Soft cores are provided in a high-level language (e.g., register transfer level language), while hard cores are lower level physical descriptions of a design (e.g., a transistor layout).

Some software distribution platforms attempt to make IP cores or IP blocks available through app store functionality. For example, some app stores allow that provide code for developers may allow a semiconductor designer to select from a number of available semi-custom blocks that can be used to build a system-on-chip (SoC) or associated drivers, or facilitate sharing of scripts between developers via the distribution platform. These distribution platforms may offer these IP codes for free, or may require payment of a use price or royalty for each instantiated use.

Some app libraries make available verified functions for such applications as motor control, lighting, power supplies, etc. However, such libraries are primarily focused on distribution of lower-level drivers and do nothing to simplify or automate the process of building higher-order applications to instantiate an end product (e.g., a washing machine, a conveyor system, a web tension control system, or other product or system).

Some companies license application-specific software for power electronics applications. However, these applications are embedded software that are accessible via an application programming interface (API), and not a graphical user interface (GUI). The software also generally requires an engineer to customize the software separately from the development work performed by other engineers responsible for product development at the customer or licensee end. According to this model, certain application blocks are customized rather than being reused and modified in an app store environment.

Control systems typically include devices that translate electrical signals to facilitate mechanical control or actuation of a physical process in a product or system. Given the low cost and ubiquity of semiconductor devices, the electrical signals are often provided by one or more microcontrollers or other programmable integrated circuits to achieve this mechanical control. There are a number of challenges associated with the use of semiconductor microcontrollers for control of products or product components. For one, semiconductor microcontrollers made by different companies do not share a common language. For example, the 8051 instruction set is used by some device, while Intel Corporation's x86 instruction set and ARM Holdings instruction set are used on other devices. Some microcontrollers also use proprietary instruction sets developed by their respective providers. Microcontrollers can also be provided as an IP core or IP block for a field-programmable gate array (FPGA) device. Although there are compilers for each of these platforms that can work with a higher-level language such as the C programming language, there are also design considerations in the product development context that require one to be close to the hardware to effect electro-mechanical control or actuation.

In addition, applications differ across the product development context. For example, a system for controlling a particular type of three-phase induction motor may be a key building block in many types of industrial applications. However, programs for using that motor as an agitator in a washing machine may differ from programs that control the motor when used as a roller in a conveyor. As such, an app store that caters to the needs of such control applications should consider both reusable building blocks such as the induction motor controller, while providing adaptability to accommodate different end-user applications (e.g., washing machine application, conveyor belt application, etc.). For a seamless experience, both the lower-level building blocks (e.g., the induction motor controller) and the higher-order application capability (e.g., washing machine versus conveyor belt) require abstraction. If only the lower-level building block is provided, then applications will be difficult to create. If only the higher-order application is offered, then the application will not run, or will run only on targeted hosts.

To address these and other issues, and to extend app stores to persons responsible for product development, one or more embodiments of this disclosure re-envision the concept of the app store for state machines. In general, an app store according to one or more embodiments described herein includes a plurality of apps representing state machines that describe the function of a product. A user can select at least one app from this plurality of apps. An intermediate step may permit a user to customize the state machine, or parameters thereof. Another intermediate step may allow the user to identify a target platform and further translate the state machine into a format readable by a semiconductor device in the target platform without requiring the user to write computer code. This step may fuse a lower-level building block with a higher-order application represented by the state machine. Another intermediate step may transact rights to use the app representing the state machine. When the app-specific code is installed on a semiconductor device, the semiconductor device with app-specific code is enabled to execute the state machine. In one or more embodiments, the state machine may also be executed in a simulation environment, on a reference platform or development board, or on a semiconductor device in an end-user product.

In an example embodiment, the system can be used to select and customize an app for execution on a microcontroller to facilitate control of a motor control system. In an example scenario, the motor control application can be for control of an agitator in a washing machine. A state machine can represent the washing machine cycle (e.g., soak, wash, dry, etc.). According to one or more embodiments, the app store platform allows the user to select an app representing the state machine, optionally customize the state machine represented by the app, and install the app on the microcontroller. Thus, the system enables the user to create an out-of-box solution for a washing machine motor controller, mitigating the need to develop custom code. In another example scenario, the motor control application may be for control of a conveyor belt. In this example, a state machine represents the conveyor belt cycle (e.g., wait, move, etc.). This alternative state machine may be selected by the user to create an out-of-box solution for conveyor belt control using the same underlying microcontroller and lower-level building blocks (or a different microcontroller using different lower-level building blocks) and without requiring the end user to develop custom code.

In this way, persons responsible for product development enjoy the benefits of an app store. For example, development time can be reduced by leveraging the apps made available by the app store, since designers do not need to write code or understand the intricacies of the microcontroller core used for the control application. By abstracting code development, the app store system can also reduce switching costs between microcontrollers. The flexibility offered by the app store can allow a project team to support multiple microcontrollers, or switch between microcontroller vendors if dictated by business needs. The app store also allows applications to be shared within a user community, and facilitates continuous improvement of a database of state machines for products and control systems.

FIG. 1 is a depiction of a state machine for a washing machine app. In particular, the state machine depicted in FIG. 1 is an example state machine implemented by a Texas Instruments microcontroller. The format shows the state machine as a finite state representation of a Turing machine. The first block or initialization state 100 is the dry state. In this state, the washing machine is empty of water and ready for a new cycle. Control then transfers to the idle state 110, which waits for a user to push a start button to begin a cycle. When the start button is pushed, control moves to the fill state 120, during which the fill valve is opened and the washing machine drum is filled with water. Control logically follows with additional states for multiple agitation cycles and a drain cycle, as shown in FIG. 1.

Figure 2:
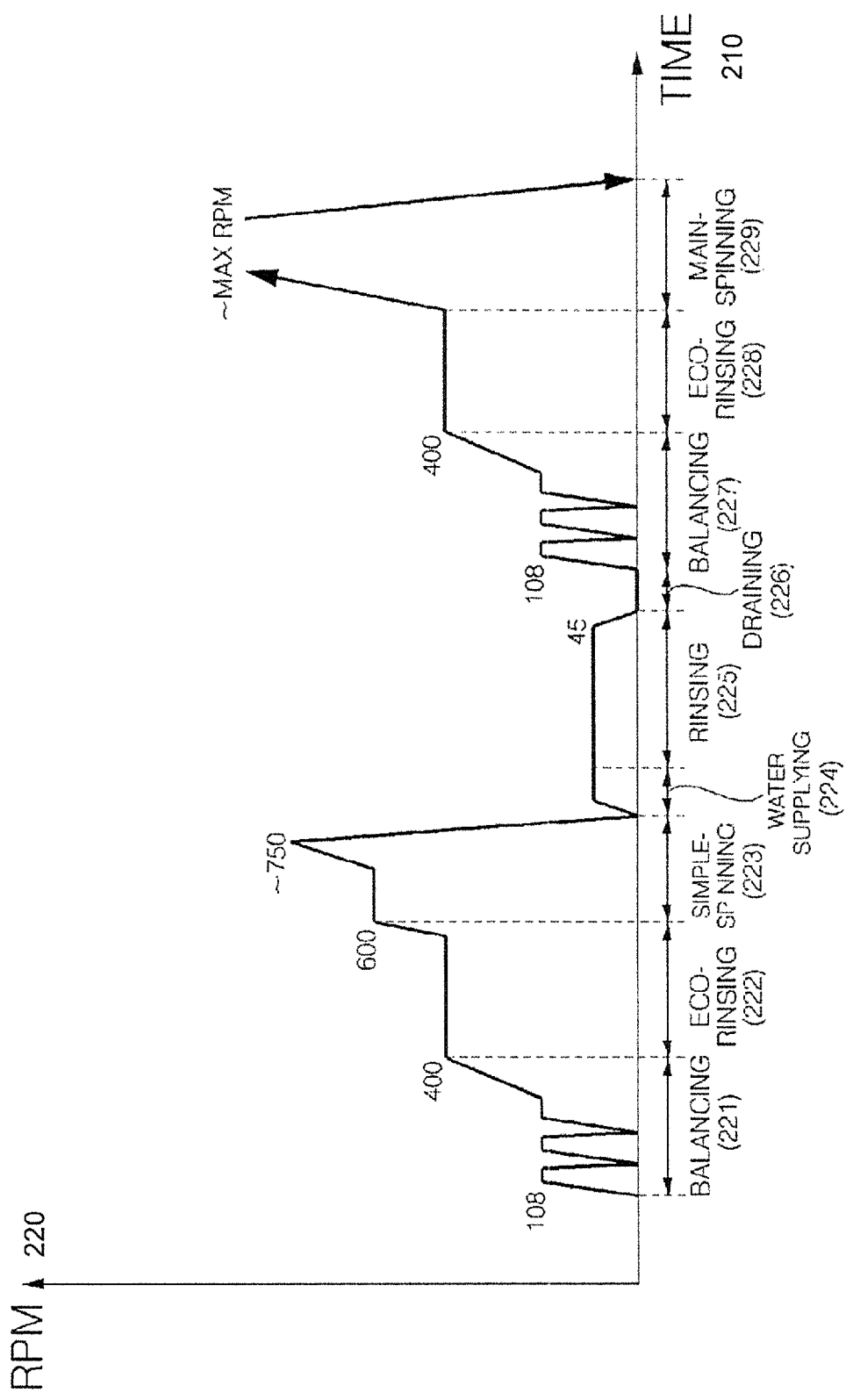
FIG. 2 is a depiction of an alternative state machine for a washing machine app.

FIG. 2 is a depiction of an alternative state machine for a washing machine app. In particular, FIG. 2 depicts an example control algorithm from LG. In contrast to the state machine format of FIG. 1, this format is not a finite state representation of a Turning machine. Instead, FIG. 2 depicts the state machine in a Cartesian coordinate system in two dimensions (on an x-y graph) showing time 210 as the abscissa (or x-axis) and rotations per minute (RPM) 220 of the motor rotating the washing machine drum as the ordinate (or y-axis). The state machine can be depicted in this format since the washing machine app progresses through states in a linear fashion (soak, wash, dry, etc.). A number of formats can be used to represent the state machine, including finite state representations of a Turing machine, Cartesian coordinate systems, tables, flowcharts, etc. In general, the state machine presents a visual representation for operation of a product, device, or machine that has at least two states.

A product illustratively refers to products or components of products for use in consumer markets (e.g., a washing machine or its agitator, a microwave oven or its electromagnetic heating element, a refrigerator or its compressor, etc.), industrial markets (a conveyor or its belt system, a refrigerator or its heating element, a refinery or its fluid-level control system), automotive and aerospace markets (anti-lock braking systems, turbo-chargers for engines, electronic fuel injection), energy markets (a solar system or its regulation a wind turbine or its gearing and generator, drilling equipment, etc.), medical devices (coil positioners in an MRI machine, pulse creation in a pacemaker, IV drip control, etc.), robotics (UAV stability, manipulator arm control, artificial limbs, etc.), wireless devices, the Internet of Things, etc. This list of product types is not intended to be exclusive, and it is to be appreciated that other types of products are also within the scope of one or more embodiments of this disclosure.

Figure 3:
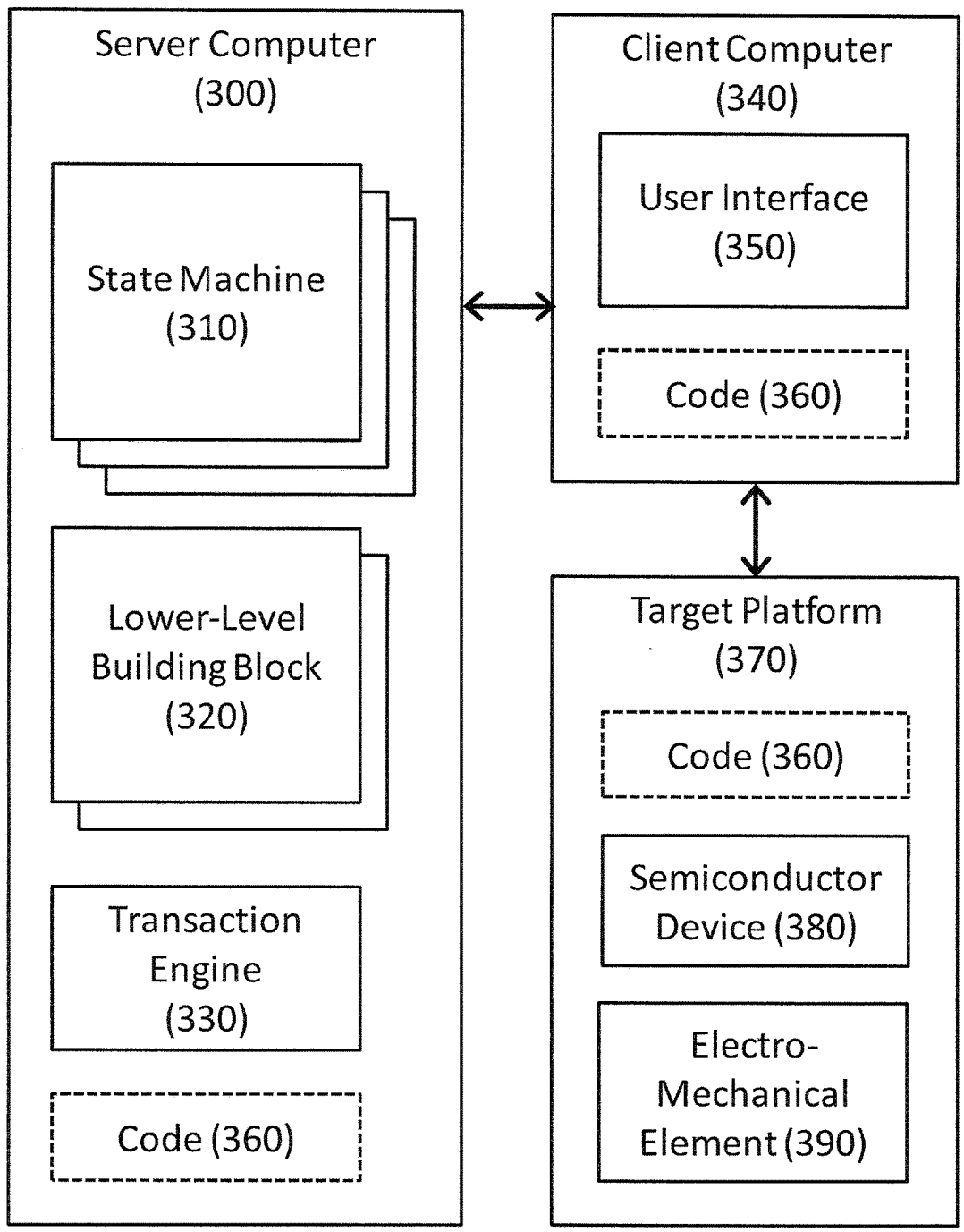
FIG. 3 is a block diagram of an app store for state machines.

FIG. 3 is a block diagram of an app store for state machines. According to the example embodiment depicted in FIG. 3, the app store environment comprises three devices, including server computer 300, client computer 340, and target platform 370. Server computer 300 is in communication with client computer 340 through any of a number of client-server configurations both locally or remotely hosted. Client computer 340 is in communication with target platform 370 through any of a number of protocols, including wired protocols such as JTAG or wireless protocols such as Bluetooth, WiFi, or Zigbbee. It is to be appreciated that some embodiments of the app store environment do not require all three of the main devices illustrated in FIG. 3, and that any of the three components can be omitted without departing from the scope of one or more embodiments described herein. For example, alternative embodiments could remove client computer 340 and work directly from server 300 to target platform 370, or be locally hosted on client computer 340 without the use of server computer 300.

Server computer 300 can be any computer system as generally understood by those of ordinary skill in the art. Server computer 300 will typically include three elements to enable an app store for state machines. A plurality of state machines 310 are stored in a storage area of the server computer 300 and made available for selection by a user. The server computer renders the plurality of state machines 310 visible to an end user, either directly or via user interface 350 of client computer 340. In one or more embodiments, an interface component executing on the server computer can generate and deliver a GUI to the client computer 340 that can be used to interact with the app store for state machines. The GUI can display the available state machines on the user interface 350 of the client device, and can also include input sections for receiving state machine selection criteria from the user.

Visibility into the plurality of state machines 310 may take different forms. For example, the interface component executing on the server computer 300 may render the plurality of state machines 310 as a list via user interface 350. The system may group categories of state machines together according to application (e.g., washing machine), according to supported vendor (e.g., Texas Instruments microcontroller), or according to other categories. The GUI served by the interface component of the server computer 300 can also provide a means to search for particular state machines. In one or more embodiments, the GUI can accept search criteria comprising key words, or may support a specific search capability to identify state machines by application (e.g., washing machine) or by supported vendor (e.g., Texas Instruments microcontroller). In response to receipt of search or selection criteria, a selection component executing on server computer 300 can select a subset of the plurality of state machines 310 that satisfy the search or selection criteria entered by the user, and either deliver the subset to the client device as a displayed list or other graphical representation for review and further selection by the user, or initiate a download of the subset of state machines to the client computer 340. A selected state machine app can display, on the user interface 350, a visual representation of the state machine represented by the app, where the state machine is designed for operation of a product that has at least two states (e.g., a washing machine, a conveyor, etc).

At least one lower-level building block 320 is available as part of the app store for state machines. To enable the generation of an end-user product without the requiring the end user to write new code, the system can make lower-level building block 320 available to the user while hiding its details from the user unless the user requests to view the underlying code of the building block 320. Thus, in one or more embodiments, the lower-level building block 320 is located on server computer 300 and is not directly visible to the user through user interface 350. In alternative embodiments, lower-level building block 320 can be stored on client computer 340, or the system can allow a user to access and modify computer code, routings, and other parameters of the lower-level building block.

Lower-level building block 320 comprises computer code, routings, and other parameters that will be bound with a state machine application (or app) to create or control a product. A lower-level building block can be associated with a particular microcontroller and/or other specific hardware. For example, the lower-level building block may be associated with a particular pin-out of the microcontroller, a motor selected for an application, or a reference board layout. The lower-level building block may be written in language close to silicon, such as register transfer language (RTL) or VHSIC hardware description language (VHDL). The lower-level building block may comprise machine language executable code for the device, or an intermediate code that can be compiled such as C. The lower-level building block describes an operation (an induction motor controller) rather than a higher-order application (e.g., a washing machine or conveyor belt). The lower-level building block 320 provides context for the state machine 310 to generate code 360 that executes on target platform 370 to enable the end-user product.

Transaction engine 330 is optionally included as part of the app store for state machines in one or more embodiments. Transaction engine 330 provides a mechanism for a user to acquire license rights to apps. In some embodiments, apps are free and provided using an open-source licensing model. In other embodiments, state machines and lower-level building blocks are separately licensed. State machines may be transacted on a freemium basis; that is, free to download but with the option of paid upgrades, such as the unlocking of additional features, customization tools, or increased license counts. Revenue models can use flat fees for unlimited use licenses, per use license fees, or other arrangements for charging an end user. The transaction model may include a use price for the design and royalty for each instantiated use.

The use of server computer 300 and the client-server computer model allows the app store for state machines to be available to a user community. A user community may include a global group, a set of users of a particular semiconductor device, a set of persons employed by a particular company, a set of persons within an engineering team, or other such groups. The user community may be defined by other boundaries not listed above, provided that at least two state machines 310 are made available by the app store and at least two users are part of the user community. Each user can use a separate client computer 340 to log onto server computer 300 and access the app store for state machines (e.g., via a wireless connection to a remote network such as the Internet, via a local wired or wireless network, etc.). Transaction engine 330 may be configured in light of the user community, using permissions or other credentials to authorize licensing of state machines 310 and related lower-level building blocks 320.

Client computer 340 can be substantially any computer system. For example, client computer 340 may be a mobile computing device, such as a laptop computer, a tablet computer, a desktop computer, a mobile phone or similar handset, etc. Client computer 340 will typically include a graphical user interface (GUI) for accessing the app store for state machines. In one or more embodiments, the GUI may be served to the client computer 340 by the server computer 300. Alternatively, the GUI may comprise an executable that resides locally on client computer 340, such that execution of the GUI causes the client computer 340 to connect to the server computer 300 for access to the library of state machines 310. Client computer 340 may be a thin client or a thick client. A thin-client architecture is designed to be small so that the bulk of the data processing occurs on the server computer 300. A thick-client architecture entails processing mainly on client computer 340. In an example thick-client architecture, server computer 300 may only be used for file storage as a cloud repository for state machines for apps.

Target platform 370 may be a product, a component of a product, a development environment, or a simulation environment for creating the product or component. In the washing machine example, target platform 370 can be the washing machine (a product), the motor for spinning the drum (a component of a product), or a development board from a semiconductor manufacturer for a microcontroller used in washing machine control (a development environment). Target platform 370 will include at least one semiconductor device 380 and may include electro-mechanical element 390. In the washing machine example, semiconductor device 380 may be a microcontroller from Texas Instruments or another manufacturer, and electro-mechanical element 390 may be a motor or motor assembly for rotating the drum of the washing machine.

Semiconductor device 380 will typically be a microcontroller, a small computer on an integrated circuit designed for embedded applications. Semiconductor device 380 may also be an FPGA, either as a completely programmable core or as a hybrid device that includes a microcontroller plus programmable logic.

The product to which state machine 310 is directed may include electro-mechanical element 390. Electro-mechanical element 390 receives signals from semiconductor device 380, and translates or transduces those signals to effect a physical or mechanical change. In the example washing machine scenario, the electro-mechanical element is the motor and the drum driven by the motor. In the example conveyor belt scenario, the electro-mechanical element is the motor and the rollers driven by the motor. Electro-mechanical element 390 may also comprise an electrooptical system, an electro-magnetic system, one or more sensors, or other systems that produce or measure a physical effect.

Code 360 includes computer code that can be used by target platform 370 to produce signals to drive semiconductor device 380. In various embodiments, code 360 can be generated on server computer 300 or client computer 340. Code 360 includes sufficient capability to implement state machine 310 and lower-level building block 320 so that semiconductor device 380 can control and actuate electro-mechanical element 390 according to the state machine selected for the target platform. Code 360 may include low-level code, such as object code directly usable by semiconductor device 380, or may include code that can be compiled or interpreted by additional software modules for use by semiconductor device 380.

Figure 4:
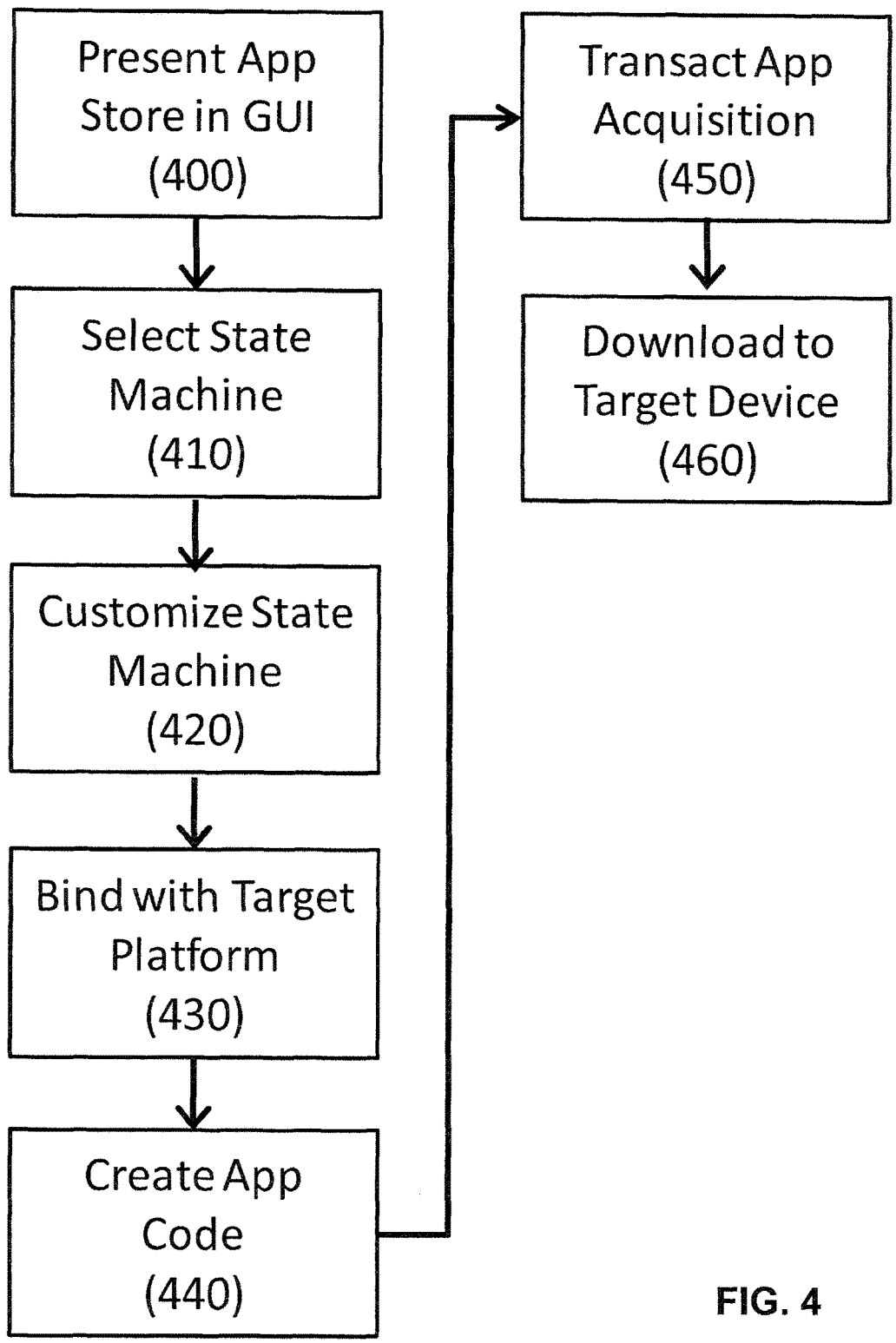
FIG. 4 is a flow chart of a method for an app store for state machines.

FIG. 4 is a flow chart of a method for an app store for state machines. While the flow chart of FIG. 4 is depicted as comprising seven steps, some embodiments may not require all seven steps to perform the method for an app store for state machines. Rather, a subset of the illustrated steps can be used. For example, the steps of customizing the state machine 420 and transacting the app acquisition 450 are optional steps. It is also to be understood that the order of operation of certain steps does not have to conform to the order shown in FIG. 4. For example, it is possible to perform step 450 (transact the app acquisition) at any point in the process—from inception through a final step after code has been downloaded and verified.

Initially, at step 400, an app store is presented. Step 400 will typically be associated with client computer 340 and a user interface as discussed below in connection with FIG. 6. At step 410, a state machine is selected for a product by a user. As previously discussed, a list of state machines may be displayed on the user's client device, and a state machine may be selected via interaction with the presented list. To assist the user in locating a desired state machine, categories of state machines may be grouped together by application (e.g., washing machine, conveyor, etc.), by supported vendor (e.g., Texas Instruments), or by one or more other categories. The app store can also implement a means to search for particular state machines. This can include keyword searches, or the ability to identify specific state machines for selection according to application (e.g., washing machine, conveyor etc.), supported vendor, or another category. A selected state machine can provide a visual representation for operation of a product that has at least two states.

At step 420, the state machine is optionally customized. In this regard, the system may include an editing component that allows the user to customize all or a specified subset of features of the selected state machine. In the washing machine example, the editing component may allow a user to adjust, insert, or delete agitation states (e.g., agitation state 130 of FIG. 1); e.g., via interaction with the state machine representation displayed on the user interface 350. The editing component may also allow the user to alter the time 210 or motor speed 220 for a particular portion of the cycle. Other adjustments to the selected state machine could also be made. In one or more embodiments, if a state machine for a particular type of application—e.g., a washing machine— is selected, the system can provide a template of a washing machine cycle, and variants yielded by user modification could be created and saved as separate or related state machines. For example, the system can allow the creation of variants of the washing machine state machine for regular wash, heavy-duty wash, and delicate wash, where each variant has an appropriately modified set of parameters to implement the correct type of wash cycle.

The two-dimensional state machine of FIG. 2 could be a three-dimensional state machine wherein the third dimension controls water temperature and the related electro-mechanical functions for blending hot water and cold water inputs. In the washing machine example, motor control could be accomplished using active disturbance rejection control (ADRC) or classic proportional-integral-derivative control (PID control). The variables into these control systems can also be adjusted.

A series of steps are then followed to enable the target device. At step 430, the state machine is bound to a target platform. This step allows a user to select a target platform on which t to execute the state machine representing the app. Step 430 may involve the selection of a particular microcontroller that comprises semiconductor device 380. However, step 430 may be omitted in systems that are platform-specific or limited to certain platforms. With the selection of the state machine in step 410 and knowledge of the target platform either inherently or through step 430, application code is generated at step 440. The code from this step is equivalent to code 360, which will be influenced by high-level properties of the application and low-level properties of the target platform including its semiconductor device 380. After the code is created at step 440, the code is downloaded to the target device 460.

At step 450, the app acquisition is optionally transacted. This involves the licensing of the state machine for the product. As discussed above in connection with the transaction engine 330, in some scenarios the system can provide apps for free using an open-source model. The system may also license state machines and lower-level building blocks separately. State machine apps may also be transacted on a freemium basis, such that the apps are free to download and have paid upgrade options that unlock additional features such as customization tools or increase license counts. In some embodiments, the system can implement revenue models that use flat fees for unlimited use licenses, per use license fees, or other arrangements for charging an end user. The transaction model may include a use price for the design and royalty for each instantiated use.

Figure 5:
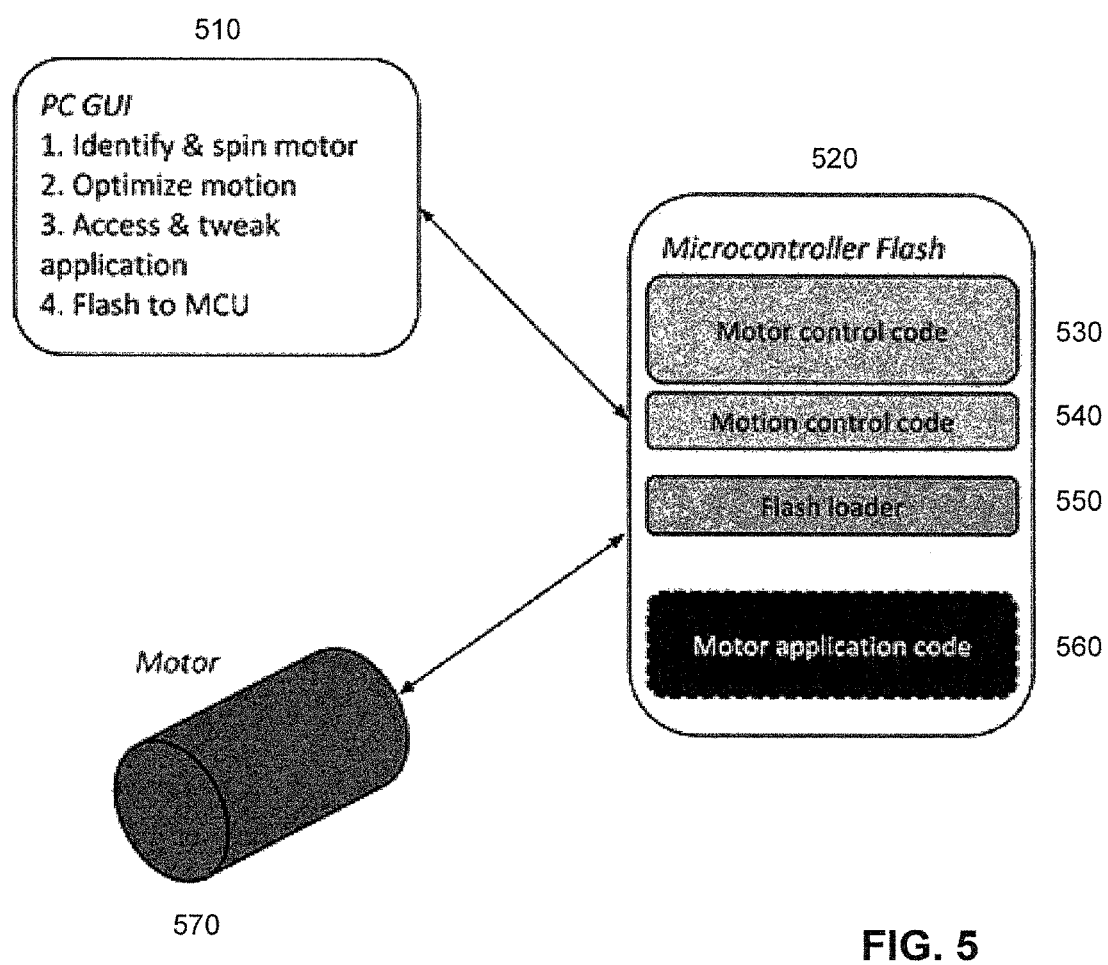
FIG. 5 is a block diagram of a portion of an app store for state machines in which the target platform includes a motor.
Figure 6:
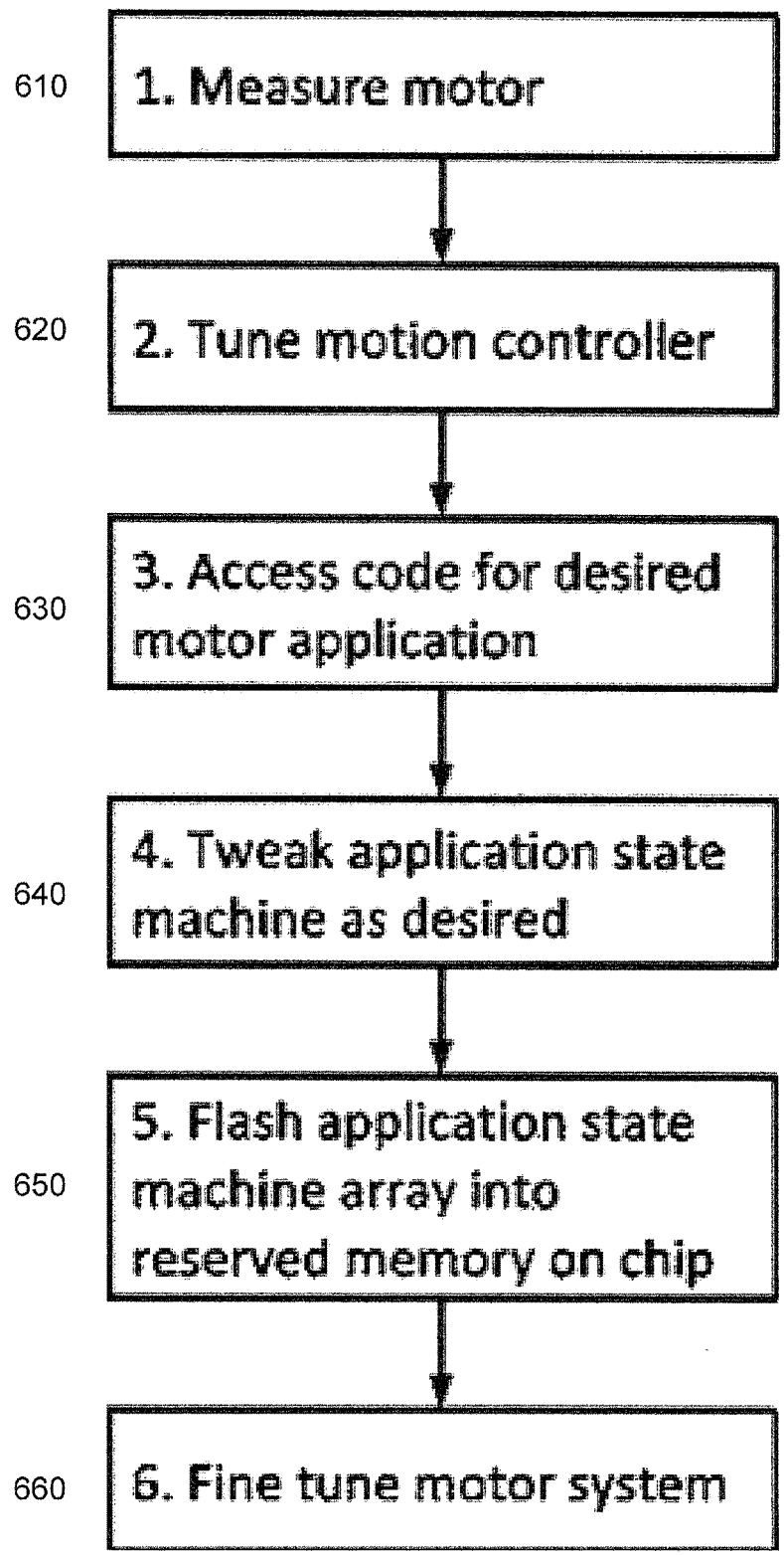
FIG. 6 is a flow chart of a method for an app store for state machines in which the target platform includes a motor.
Figure 7:
FIG. 7 is a graphical user interface (GUI) for an app store for state machines in which the target platform includes a motor.

FIGS. 5-7 illustrate an embodiment of the app store for state machines in which the target platform includes a motor. FIG. 5 is a block diagram of a portion of an app store for state machines in which the target platform includes a motor. Computer 510 with PC GUI is similar to client computer 340 with user interface 350. There are additional initialization steps involved with the motor application discussed in FIG. 6. Memory 520 and motor 270 are similar to target platform 370. The processing elements of semiconductor device 380 as well as server computer 300 and its components are not shown in FIG. 5, but would typically be implemented. Motor 570 is a form of electro-mechanical element 390.

Memory 520 in the motor example is a microcontroller flash, typically as part of a microcontroller, but may also be implemented as a separate memory chip. In the motor example, memory 520 comprises at least four elements. Motor control code 530 comprises fundamental software routines to activate the motor (on, off, spin, etc.). Motion control code 540 comprises complex software routines to control the quality of the motor (acceleration, deceleration, jerk, etc.). Flash loader 550 comprises software to enable downloading of software into memory 520, as discussed above in connection with step 460 of FIG. 4. Motor application code 560 comprises software that executes the state machine for the higher-order application (washing machine, conveyor belt, etc.). In this example, code 360 is stored as separate modules: lower-level building blocks (e.g. lower-level building blocks 320) in memories associated with motor control code 530 and motion control code 540, and the state machine (e.g., from the plurality of state machines 310) in memory associated with motor application code 560.

FIG. 6 is a flow chart of a method for an app store for state machines in which the target platform includes a motor. Three of these steps are similar to corresponding steps in the method shown in FIG. 4. The step of accessing code for desired motor 630 is similar to the step of selecting the state machine 420. The step of tweaking the application state machine 640 is similar to the step of customizing the state machine 420. The step of flashing the application to reserved memory on chip 650 is one form of the step of downloading to a target device 460.

In the embodiment depicted in FIG. 6, certain steps from the general method shown in FIG. 4 are implicit, handled in an alternate fashion, or not included. The step of presenting the app store in a GUI 400 is implicit in the initialization sequences discussed below in steps 610 and 620. The steps of binding with the target platform 430 and creating app code 440 are at least in part handled at run time in the example depicted in FIG. 6. As discussed above with regard to memory 520, there are separate areas to store lower-level building blocks (in 530 and 540) and the state machine (in 560). The step of transacting app acquisition 450 is not shown in FIG. 6, and as discussed above in connection with FIG. 4, the is an optional step in one or more embodiments.

Computer 510 and steps 610 and 620 describe initialization that is part of the motor example. The step of measuring the motor 610 reads the parameters of the motor 570 to identify the motor and to determine what motor control code 530 and related parameters should be used. The step of tuning the motion controller 620 optimizes the motion control of motor 570 so that the motor functions smoothly and to determine what motion control code 540 and related parameters should be used. For example, motor control could be accomplished using active disturbance rejection control (ADRC) or classic proportional-integral-derivative (PID) control. The variables into these control systems could also be adjusted during step 620 and stored in memory associated with motion control code 540. Step 660 is an additional step in the motor example where the system is fine-tuned. This may entail further changes to memory 520.

FIG. 7 is an example, non-limiting graphical user interface (GUI) for the present invention in which the target platform includes a motor. This is one of a plurality of screens that may be used in the motor example. In other embodiments, all content could be displayed on a single screen. Step 710 is parallel to step 610 and involves the identification of the motor. Steps 710 and 720 are parallel to step 620 an involve tuning of the motion controller for the motor. FIG. 7 focuses specifically on step 720—speed profile control, which is an element of motor control. Step 730 is parallel to step 630 and involves selection of the state machine. Step 730 further suggests an alternative embodiment in which the state machine is developed, which may be accomplished via interaction with the GUI. Area 740 shows a visual representation of speed profile control parameters for a motor. On other screens, area 740 could show a visual representation of a selected state machine, similar to FIG. 1 or FIG. 2.

Other alternative embodiments may include different initialization steps, alternative configurations, or other elements that deviate from the general example of an app store for state machines shown in FIGS. 3 and 4 and the motor example shown in FIGS. 5-7. Other forms of electromechanical element 390 other than motor 570 could also be used. The foregoing description is only intended to be illustrative and should not be construed as limiting. Other embodiments of the invention will readily suggest themselves to those of ordinary skill in the art.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the video editing system described herein can be implemented in any computer system or environment having any number of memory or storage units (e.g., the memories of server computer 300, client computer 340, or target platform 370), and any number of applications and processes occurring across any number of storage units. This includes, but is not limited to, an environment with server computers and client computers deployed in a network environment or a distributed computing environment, having remote or local storage. For example, with reference to FIG. 3, the plurality of state machines 310, lower-level building block 320, transaction engine 330, and code 360 can be stored on a single memory associated with a single device, or can be distributed among multiple memories associated with respective multiple devices. Similarly, the plurality of state machines 310, lower-level building block 320, transaction engine 330, and code 360 can be executed by a single processor, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
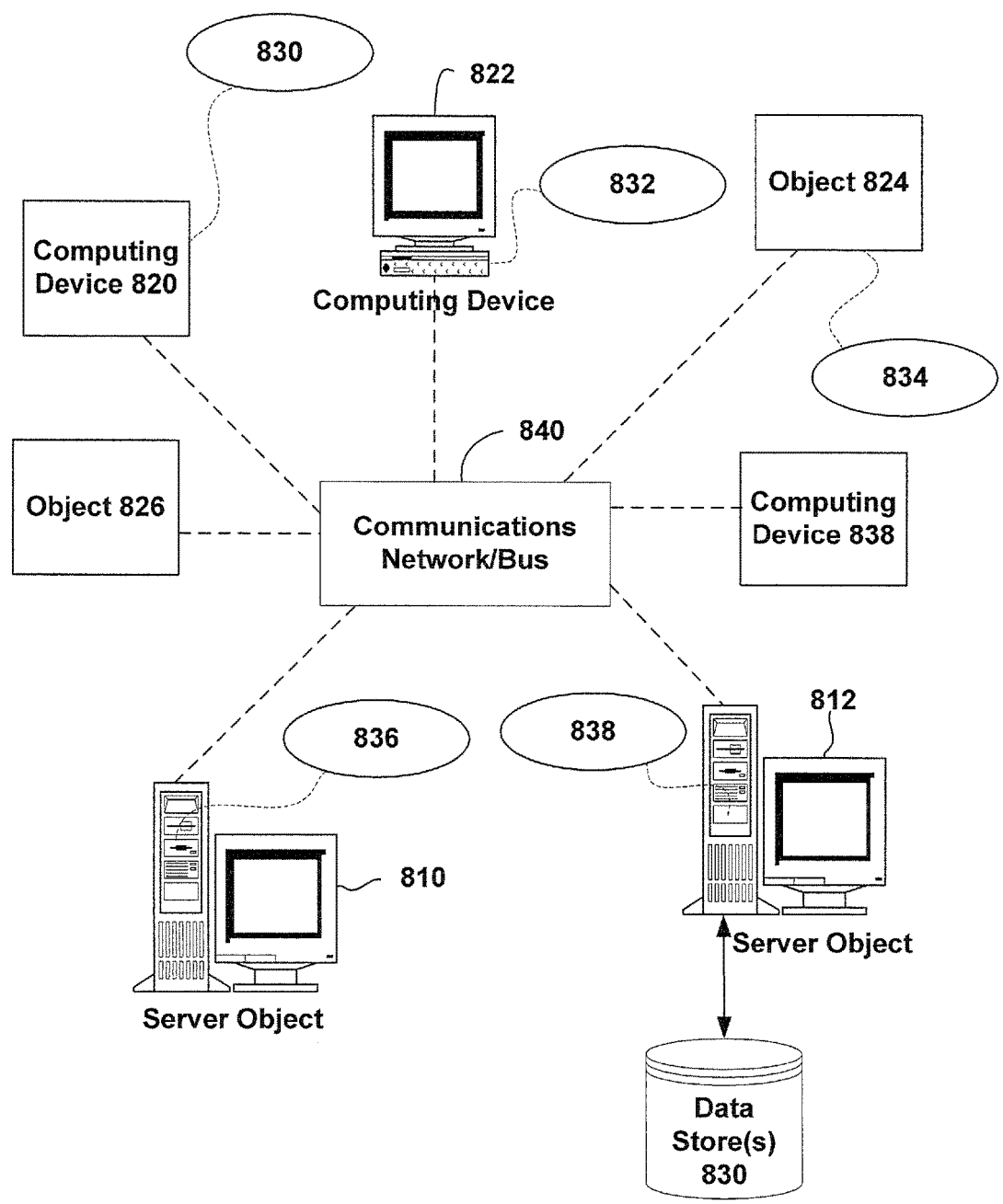
FIG. 8 is a block diagram representing an exemplary networked or distributed computing environment for implementing one or more embodiments described herein.

FIG. 8 provides a schematic diagram of an exemplary networked or distributed computing environment. The distributed computing environment includes computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, digital music players, personal computers, laptops, tablets, etc., where embodiments of the inertia estimator described herein may reside on or interact with such devices.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 840 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Computing objects 810, 812, etc. may also serve as client computing objects or devices 820, 822, 824, 826, 828, etc., as may be characteristic of a distributed computing environment.

Exemplary Computing Device

Figure 9:
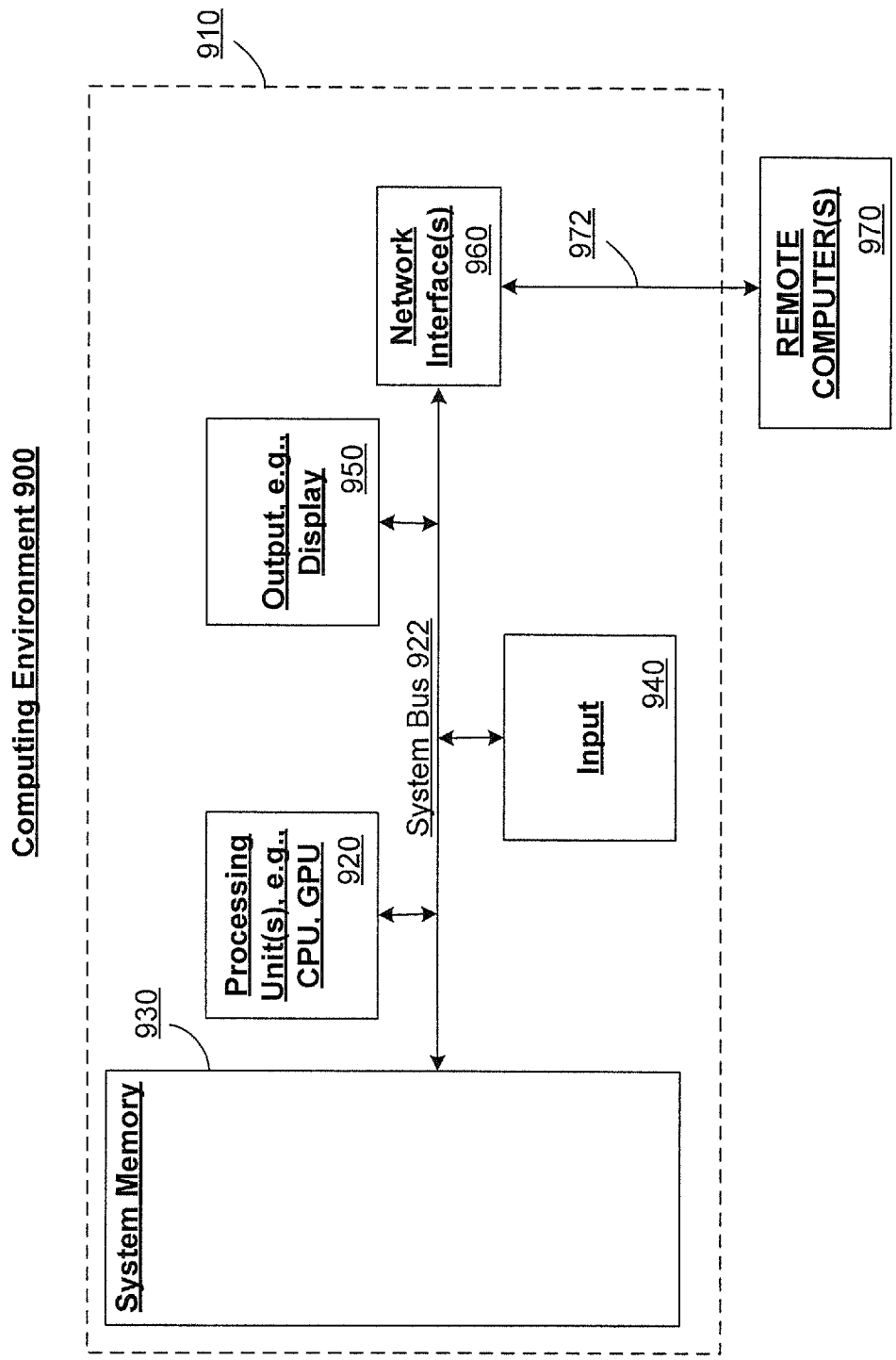
FIG. 9 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 9 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing system environment 900 be interpreted as having any dependency or requirement relating to any one or combination of components illustrated in the exemplary computing system environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950. In one or more embodiments, input devices 940 can provide user input to user interface 350, while output interface 950 can correspond to user interface 350.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein, components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 4 and 6). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system for delivering state machine applications for control of a product, comprising:
   a memory that stores computer-executable components; and
   a processor, operatively coupled to the memory, that executes the computer-executable components, the computer-executable components comprising:
      an interface component configured to receive input data from a client device specifying one or more selection criteria;
      a selection component configured to select, based on the one or more selection criteria, a state machine application from a library of state machine applications maintained on the memory; and
      a delivery component configured to send the state machine application to a microcontroller, wherein in response to execution by the microcontroller, the state machine application performs control of an electro-mechanical system in accordance with a state machine defined by the state machine application.

2. The system of claim 1, wherein the electro-mechanical system comprises at least a motor that is controlled by the microcontroller.

3. The system of claim 1, wherein the state machine application is configured to perform the control using at least one of active disturbance rejection control or proportional-integral-derivative control.

4. The system of claim 1, wherein the interface component is configured to display, on the client device, a graphical representation of the library of state machine applications, and wherein the input data comprises an identification of the state machine received via interaction with the graphical representation.

5. The system of claim 4, wherein the interface component is further configured to display the library of state machine applications according to two or more categories of state machines represented by the respective state machine applications.

6. The system of claim 5, wherein the categories comprise at least one of a type of application or electro-mechanical system to which the respective state machine applications relate or a device vendor supported by the respective state machine applications.

7. The system of claim 1, further comprising an editing component configured to modify one or more parameters of the state machine based on modification input received via interaction with a graphical representation of the state machine to yield a modified state machine application.

8. The system of claim 1, further comprising a transaction engine configured to license an end user to use the state machine application.

9. A method for selecting and deploying state machine applications, comprising:
   receiving, by a system comprising at least one processor, input data from a client device specifying one or more selection criteria;
   selecting, by the system based on the one or more selection criteria, a state machine application from a library of state machine applications stored by the system; and
   sending, by the system, the state machine application to a microcontroller, wherein execution of the state machine application by the microcontroller causes the microcontroller to control an electro-mechanical system in accordance with a state machine defined by the state machine application.

10. The method of claim 9, further comprising displaying, by the system, a graphical representation of the library of state machine applications on the client device.

11. The method of claim 10, wherein the receiving comprises receiving an identification of the state machine in response to interaction with the graphical representation, and wherein the interaction selects the state machine application corresponding to the state machine.

12. The method of claim 10, wherein the displaying comprises categorizing the library of state machine applications according to two or more categories of state machines represented by the respective state machine applications.

13. The method of claim 12, wherein the categorizing comprises categorizing the library of state machine applications according to at least one of a type of application or electro-mechanical system to which the respective state machine applications relate or device vendors supported by the respective state machine applications.

14. The method of claim 9 further comprising:
receiving modification input from the client device defining a modification to the state machine defined by the state machine application; and
modifying the state machine application in accordance with the modification input.

15. The method of claim 9, further comprising issuing a license that permits an end user associated with the client device to use the state machine application.

16. A non-transitory computer-readable medium having stored thereon instructions that, in response to execution, cause a computer system to perform operations, comprising:
receiving input data from a client device specifying one or more selection criteria;
selecting based on the one or more selection criteria, a state machine application from a library of state machine applications stored by the system; and
sending the state machine application to the client device a microcontroller,
wherein the state machine application is configured to, in response to execution by the microcontroller, perform control of an electro-mechanical system in accordance with a state machine defined by the state machine application.

17. The non-transitory computer-readable medium of claim 16, wherein the operations further comprise displaying a graphical representation of the library of state machine applications on the client device, wherein the receiving the input data comprises receiving an identification of the state machine in response to an interaction with the graphical representation that selects the state machine.

18. A method for an application store for state machines, comprising:
presenting a library via a computer, the library comprising a plurality of state machines, each state machine comprising a visual representation for operation of a product, the product being separate from the computer;
receiving a selection of a state machine of the plurality of state machines; and
generating, in response to the receiving, computer code that enables the state machine,
wherein
the computer code includes a low-level building block configured for execution by the product,
the product comprises at least one of a microcontroller, board layout, or electromechanical device, and
the execution of the computer code by the product causes the product to perform control of an electromechanical system in accordance with the state machine.

19. The method of claim 18, wherein the product is a consumer product, an industrial product, an automotive product, an aerospace product, an energy product, a medical device, a robot, or a wireless device.

20. The method of claim 18, wherein each of the plurality of state machines defines at least two states.

21. The method of claim 18, wherein the visual representation of the state machine is a finite state representation of a Turing machine, a Cartesian coordinate system, a table, or a flowchart.

22. The method of claim 18 further comprising licensing use of the computer code with the product through a transaction engine.

23. The method of claim 22, wherein the transaction engine enables freemium licensing.

24. The method of claim 18, wherein at least one of the plurality of state machines is contributed by a user community.

25. The method of claim 18, further comprising:
receiving a customization parameter; and
configuring the computer code based on the customization parameter.

26. The method of claim 18, wherein
the plurality of state machines are operable on a plurality of products, and the method further comprises:
receiving a selection of one of the plurality of products; and
modifying the computer code based on the selection of the one of the plurality of products.

* * * * *